May 8, 1956  P. E. GEISEL  2,744,381
JET POWER PLANT FOR AIRCRAFT
Filed June 25, 1953

INVENTOR.
PAUL E. GEISEL
BY
ATTORNEYS

123
United States Patent Office 2,744,381
Patented May 8, 1956

2,744,381

JET POWER PLANT FOR AIRCRAFT

Paul E. Geisel, Philadelphia, Pa., assignor to Arsene N. Lucian, Llanerch, Pa.

Application June 25, 1953, Serial No. 363,980

4 Claims. (Cl. 60—35.6)

This invention relates to a jet power plant for aircraft and has particular reference to the securing of increased mass displacement of the gases forming the jet.

Present aircraft jet power plants are designed with relatively invariable jet forming or controlling elements leading to inflexible characteristics of operation. At high altitudes and high speeds a high jet velocity may be tolerated, but at lower altitudes and when operation at lower speeds is desirable high jet velocities are not efficient and involve an undue consumption of fuel to secure operation.

In accordance with the present invention, the gases are subjected to variable diffusion with augmentation of mass flow at lower velocities to secure better efficiency. The objects of the invention relate to the attainment of these ends and will be best understood from the following description read in conjunction with the accompanying drawing, in which.

Figure 1:
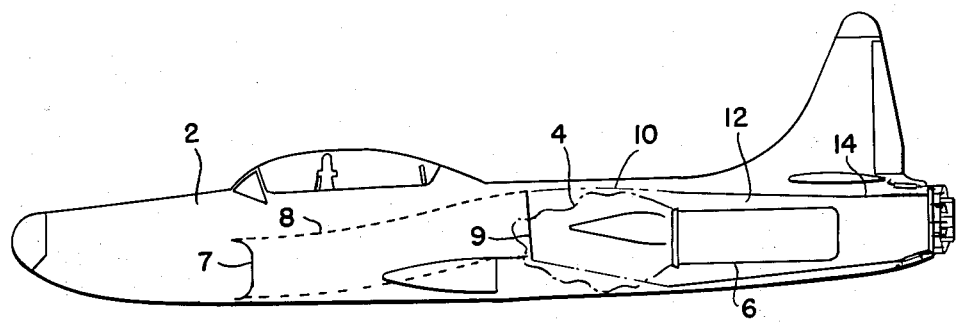
Figure 1 is a diagrammatic elevation of a jet plane embodying the invention.

There is diagrammed at 2 a conventional jet plane which, aside from the modifications involved in accordance with the present invention, may have usual construction which need, therefore, not be described.

The jet engine is diagrammed at 4 and may consist of the usual aircraft gas turbine assembly such as is customarily used for the generation of the high velocity driving gases which leave the engine through the exhaust pipe 6.

In accordance with the present invention, ram air enters scoops 7 at opposite sides of the fuselage and is directed by air ducts 8 to the engine. Auxiliary air scoops 9 communicate through ducts 10 to provide ram air to a shroud pipe 14 which surrounds the exhaust pipe 6 to provide an annular passageway 12 for the air. The particular arrangement for bringing air to the passages 12 may take various forms and such air may be, in part, derived from scoops 7 and 9 or solely derived from one of these scoops depending upon the particular arrangement of the parts. In any event, there is involved under ram action a considerable mass flow of air through the passage 12 about the exhaust pipe 6. Through the rearward region of the shroud pipe 14 both the gases from the engine and the air flow with some admixture at the periphery of the passage defined by the shroud pipe but with a substantial surrounding of the hot gases by the cooler air.

Figure 2:
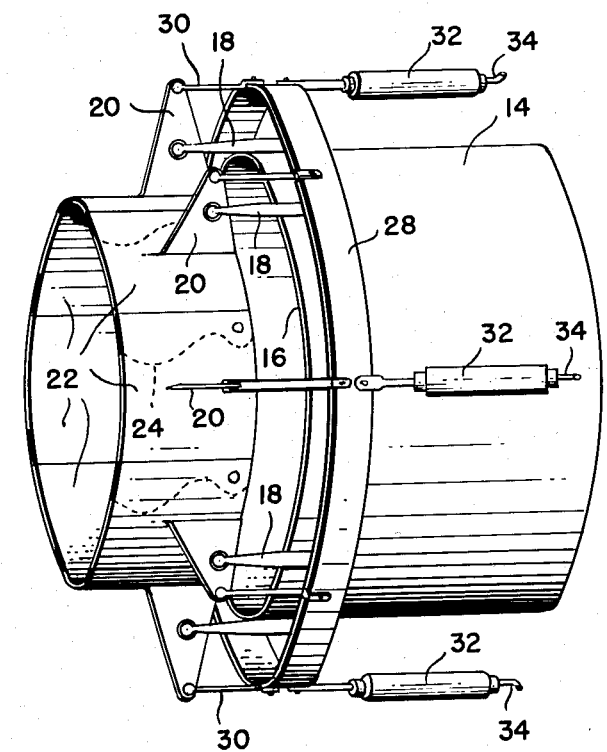
Figure 2 is a perspective view showing details of the elements for providing diffusion.
Figure 3:
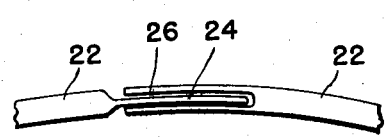
Figure 3 is a fragmentary view showing the interconnections between adjacent diffuser vanes.

The invention is primarily concerned with the handling of the gas-air stream at the tail portion of the shroud pipe 14, and reference may be made particularly to Figure 2 for details.

At its rearmost end the shroud pipe 14 is provided with rearwardly extending brackets 18 to the rearmost ends of which there are pivoted arms 20 which support vanes 22.

Any suitable number of these vanes may be provided and, in their non-deflecting positions, these vanes essentially define a cylinder coaxial with the shroud pipe 14, the cylinder, however, being of substantially smaller diameter so as to provide two regions of flow, one, the central region, receiving the gases passing through the central portion of the shroud pipe, while the other defined by the inner circumference of the shroud pipe and the outer circumference of the assembly of vanes receives the annular portions of the exhaust gases and air. As will be noted from Figure 2, the forward edges of the vanes 22 may be located somewhat to the rear of the tail end of the shroud pipe 14 though, under some conditions, it may be desirable to have an overlapping of these elements.

In order to provide continuity of the vane assembly as tilting of the vanes takes place, the vanes are desirably provided with extensions 24 of each vane entering a corresponding slot 26 of an adjacent vane. The fit is sufficiently loose so that, as the vanes are tilted about the pivots provided by the supports 18, the distortion of the vane assembly from a cylinder to an approximate cone will be permitted by clearances, the vanes themselves being rigid so that the cone which they roughly define upon tilting will actually be made up of a series of generally cylindrical sections.

The vanes should be simultaneously tilted at the same angles with respect to the axis of the assembly and to achieve this end there is provided an annular ring 28 provided with flexible links 30 which are pivoted to the outer ends of the vane supporting levers 20. The ring 28 is arranged to be moved axially by pneumatically or hydraulically operated plungers received in fixed cylinders 32, which latter are connected through pipes 34 to any suitable operating device for the introduction and removal of the actuating fluid. It will be evident that as the ring 28 moves toward the right, as viewed in Figure 2, the links 30 will be correspondingly moved to effect tilting of the levers 20 and corresponding tilting of the individual vanes to desired angles of divergence.

It will be evident from the foregoing that in operation the mass flow of turbine exhaust gases and air may be diverted to a variable extent depending upon the tilting of the vanes. This results in a variable diffusing action for the changing of the diameter of the effective issuing jet as may be required to secure the most desirable conditions for flying at various speeds and altitudes. In particular, the diffusing action leads to reduction in axial velocity as outward diffusion is increased thereby to secure an optimum effective relationship between the velocity of the driving gases, including air, and the velocity of the aircraft relative to the surrounding atmosphere.

It will be evident that numerous variations in details may be made without departing from the scope of the invention as defined by the following claims.

What is claimed is:

1. In an aircraft, means for producing a stream of high velocity propulsion gases, exhaust means conducting said stream of high velocity propulsion gases, a shroud pipe for conducting an annular stream of air around said propulsion gas conducting means extending beyond the downstream end of said gas conducting means, said shroud pipe confining said air stream to define an outer stream boundary, and means positioned adjacent to the downstream end of said shroud pipe, defining a cross-sectional area less than that defined by said shroud pipe and having its downstream end portion extending beyond the downstream end of said shroud pipe for diverting outwardly from the axis of the air stream at least some of the stream forming air.

2. In an aircraft, means for producing a stream of high velocity propulsion gases, exhaust means conducting said stream of high velocity propulsion gases, a shroud pipe for conducting an annular stream of air around said propulsion gas conducting means extending beyond the downstream end of said gas conducting means, said shroud pipe confining said air and gas streams to define an outer stream boundary, and means positioned adjacent to the downstream end of said shroud pipe, defining a cross-sectional area less than that defined by said shroud pipe and having its downstream end portion extending beyond the downstream end of said shroud pipe for diverting outwardly from the axis of the streams at least some of the stream forming air and gases.

3. In an aircraft, means for producing a stream of high velocity propulsion gases, exhaust means conducting said stream of high velocity propulsion gases, a shroud pipe for conducting an annular stream of air around said propulsion gas conducting means extending beyond the downstream end of said gas conducting means, said shroud pipe confining said air and gas streams to define an outer stream boundary, and means positioned adjacent to the downstream end of said shroud pipe, defining a cross-sectional area less than that defined by said shroud pipe and having its downstream end portion extending beyond the downstream end of said shroud pipe for diverting outwardly from the axis of the streams at least some of the stream forming air, the last mentioned means comprising a plurality of intermeshing vanes adjustable to various angles of tilt relative to the stream axis to define approximately a variable angle deflecting conical surface.

4. In an aircraft, means for producing a stream of high velocity propulsion gases, exhaust means conducting said streams of high velocity propulsion gases, a shroud pipe for conducting an annular stream of air around said propulsion gas conducting means extending beyond the downstream end of said gas conducting means, said shroud pipe confining said air and gas streams to define an outer stream boundary, and means positioned adjacent to the downstream end of said shroud pipe, defining a cross-sectional area less than that defined by said shroud pipe and having its downstream end portion extending beyond the downstream end of said shroud pipe for diverting outwardly from the axis of the stream at least some of the stream forming air and gases, the upstream end of said diverting means being positioned in the region of the boundary between the stream forming air and the stream forming gases.

References Cited in the file of this patent
UNITED STATES PATENTS

| | | |
|---|---|---|
| 2,094,707 | Jones | Oct. 5, 1937 |
| 2,462,953 | Eaton et al. | Mar. 1, 1949 |
| 2,603,062 | Weiler | July 15, 1952 |
| 2,637,163 | Brown et al. | May 5, 1953 |
| 2,637,164 | Robson et al. | May 5, 1953 |